US006997509B2

(12) United States Patent
Kain

(10) Patent No.: US 6,997,509 B2
(45) Date of Patent: Feb. 14, 2006

(54) JUVENILE SEAT CUP HOLDER

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 608 days.

(21) Appl. No.: 10/032,633

(22) Filed: Oct. 19, 2001

(65) Prior Publication Data
US 2003/0075957 A1    Apr. 24, 2003

(51) Int. Cl.
A47C 1/08    (2006.01)
(52) U.S. Cl. ................. 297/250.1; 297/188.01
(58) Field of Classification Search ............ 297/188.1, 297/250.1, 256.16, 188.14, 188.01, 188.15, 297/188.21, 188.19, DIG. 11, 188.11, 238, 297/113, 115; 248/311.2
See application file for complete search history.

(56) References Cited

U.S. PATENT DOCUMENTS

| | | | |
|---|---|---|---|
| 2,436,294 A * | 2/1948 | Glatstein ................ 297/115 |
| 2,548,481 A * | 4/1951 | Knowler et al. ........... 244/223 |
| 2,584,481 A * | 2/1952 | Mast et al. ................ 297/115 |
| 3,136,578 A * | 6/1964 | Tihovici ................ 297/188.16 |
| 3,506,301 A * | 4/1970 | Van Santen ................ 297/113 |
| 3,951,448 A * | 4/1976 | Hawie ................ 297/113 |
| 4,191,420 A * | 3/1980 | Fassett et al. ............ 312/235.6 |
| 4,434,961 A | 3/1984 | Hoye |
| 4,527,830 A | 7/1985 | Meyers |
| 4,719,764 A * | 1/1988 | Cook ................ 62/261 |
| 4,733,908 A | 3/1988 | Dykstra et al. |
| 4,749,229 A * | 6/1988 | Dorto ................ 297/238 |
| 4,759,584 A | 7/1988 | Dykstra et al. |
| 4,818,017 A | 4/1989 | Dykstra et al. |
| 4,828,211 A | 5/1989 | McConnell et al. |
| 4,927,200 A | 5/1990 | Wilkins |
| 4,943,111 A | 7/1990 | VanderLaan |
| 5,007,610 A | 4/1991 | Chriwtiansen et al. |
| 5,072,909 A | 12/1991 | Huang |
| 5,085,390 A * | 2/1992 | Murphy ................ 248/311.2 |
| 5,131,716 A | 7/1992 | Kwasnik et al. |
| 5,150,946 A | 9/1992 | Marfilius et al. |
| 5,205,608 A * | 4/1993 | Stig ................ 297/238 |
| 5,217,277 A * | 6/1993 | Rasnick et al. ............ 297/145 |
| 5,248,183 A | 9/1993 | Gignac et al. |
| 5,286,084 A | 2/1994 | Bart |
| 5,289,962 A | 3/1994 | Tull et al. |
| 5,332,286 A | 7/1994 | Atherton et al. |
| 5,336,146 A * | 8/1994 | Piaget et al. ................ 482/54 |
| 5,358,307 A * | 10/1994 | Shafer et al. ............ 297/188.2 |
| 5,494,249 A | 2/1996 | Ozark et al. |
| 5,505,516 A * | 4/1996 | Spykerman et al. ...... 248/311.2 |
| 5,516,194 A * | 5/1996 | Maule ................ 297/284.1 |
| 5,615,925 A | 4/1997 | Kain |
| 5,618,018 A | 4/1997 | Baniak |
| 5,628,486 A | 5/1997 | Rossman et al. |
| 5,662,377 A * | 9/1997 | Holdampf et al. .......... 297/238 |
| 5,685,604 A * | 11/1997 | Kain ................ 297/256.15 |
| 5,746,363 A | 5/1998 | Teller et al. |
| 5,775,771 A * | 7/1998 | La Cour et al. ............ 297/238 |
| 5,788,324 A | 8/1998 | Shea et al. |
| 5,857,633 A * | 1/1999 | Pelchat et al. ............ 248/311.2 |

(Continued)

Primary Examiner—Peter M. Cuomo
Assistant Examiner—Erika Garrett
(74) Attorney, Agent, or Firm—Barnes & Thornburg LLP

(57) ABSTRACT

A juvenile seat is provided including a base and a cup holder. The cup holder is pivotably coupled to the base to move between a closed position adjacent the base and an opened position extending from the base.

17 Claims, 3 Drawing Sheets

U.S. PATENT DOCUMENTS

| | | | |
|---|---|---|---|
| 5,899,534 A * | 5/1999 | Gray | 297/484 |
| 5,947,554 A | 9/1999 | Mashkevich | |
| 5,964,502 A | 10/1999 | Stephens | |
| 5,997,082 A * | 12/1999 | Vincent et al. | 297/188.19 |
| 6,019,334 A | 2/2000 | Shinomiya | |
| 6,065,729 A | 5/2000 | Anderson | |
| 6,105,917 A | 8/2000 | Yabuya et al. | |
| 6,142,574 A | 11/2000 | Alexander | |
| 6,193,312 B1 * | 2/2001 | Yoshida et al. | 297/256.16 |
| 6,220,660 B1 | 4/2001 | Bedro et al. | |
| 6,250,527 B1 | 6/2001 | Mizue et al. | |
| 6,253,975 B1 | 7/2001 | Ichioka et al. | |
| 6,264,273 B1 | 7/2001 | Waters, Sr. | |
| 6,467,839 B1 * | 10/2002 | Kain | 297/188.14 |
| 6,485,097 B1 * | 11/2002 | Yuzawa | 297/188.01 |
| 6,547,326 B1 * | 4/2003 | Walkinshaw et al. | 297/188.01 |

* cited by examiner

JUVENILE SEAT CUP HOLDER

BACKGROUND AND SUMMARY

The present application relates to a juvenile seat having a cup holder movable between a closed position and an opened position.

Juvenile seats and booster seats for use in automobiles are generally known and are in relatively widespread use. It is desirable to provide such a seat having a cup holder pivotable between a closed position and an opened position.

According to an illustrative embodiment, a juvenile seat is provided including a base having a seating surface and a cup holder movable relative to the base. The cup holder is coupled to one side of the base for pivotable movement between a closed position and an opened position.

The cup holder includes a shell and a cup retainer provided on an inner surface of the shell. The base has a front, a rear, and opposite sides, the seating surface being positioned between the sides. The cup holder is coupled to one of the sides and is pivotable between the opened and closed positions. The side to which the cup holder is coupled has an inwardly facing wall and an outwardly facing wall, the walls being joined at upper and front portions thereof and spaced apart along the lengths of each wall.

A cavity is provided in the outwardly facing wall of one side to receive the cup retainer when the cup holder is in the closed position. Spaced apart opposing interior walls extend from the outwardly facing wall toward the inwardly facing wall. Each interior wall includes a post extending toward the other interior wall for mounting the cup holder. The shell of the cup holder includes first and second connector portions having openings to receive the posts. When a user moves the cup holder between the opened and the closed positions, the connector portions pivot about the posts.

In the closed position, the cup retainer is between the inwardly facing wall of the side of the base and the outer shell surface of the cup holder. At least a majority of the cup retainer is in the cavity when the cup holder is in the closed position. In this closed position, the shell of the cup holder continues the contour of the side of the base. Illustratively, the outer shell surface and a front portion of the outwardly facing wall are convex. The convex shape of the shell forms a smooth convex shape with the outwardly facing wall.

Illustratively, a portion of the inner surface of the cup holder shell supports the bottom portion of a cup. The cup retainer includes a pair of end walls and a pair of side walls. Each side wall includes a pair of straight sections and a concave curved section therebetween.

In one embodiment, the concave curved sections are spaced apart and arranged to provide a space sized to receive a round cup or can therein. The straight sections of the side walls and the end walls cooperate to provide a space sized to receive a rectangular "juice box." Thus, the cup retainer is adapted to receive both round and rectangular objects therein.

Additional objects, features, and advantages of the present application will become apparent to those of ordinary skill in the art upon consideration of the following detailed description of preferred embodiments exemplifying the best mode of carrying out the subject matter of this application as presently perceived.

BRIEF DESCRIPTION OF THE DRAWINGS

The detailed description particularly refers to the accompanying figures in which.

DETAILED DESCRIPTION OF THE DRAWINGS

Figure 1:
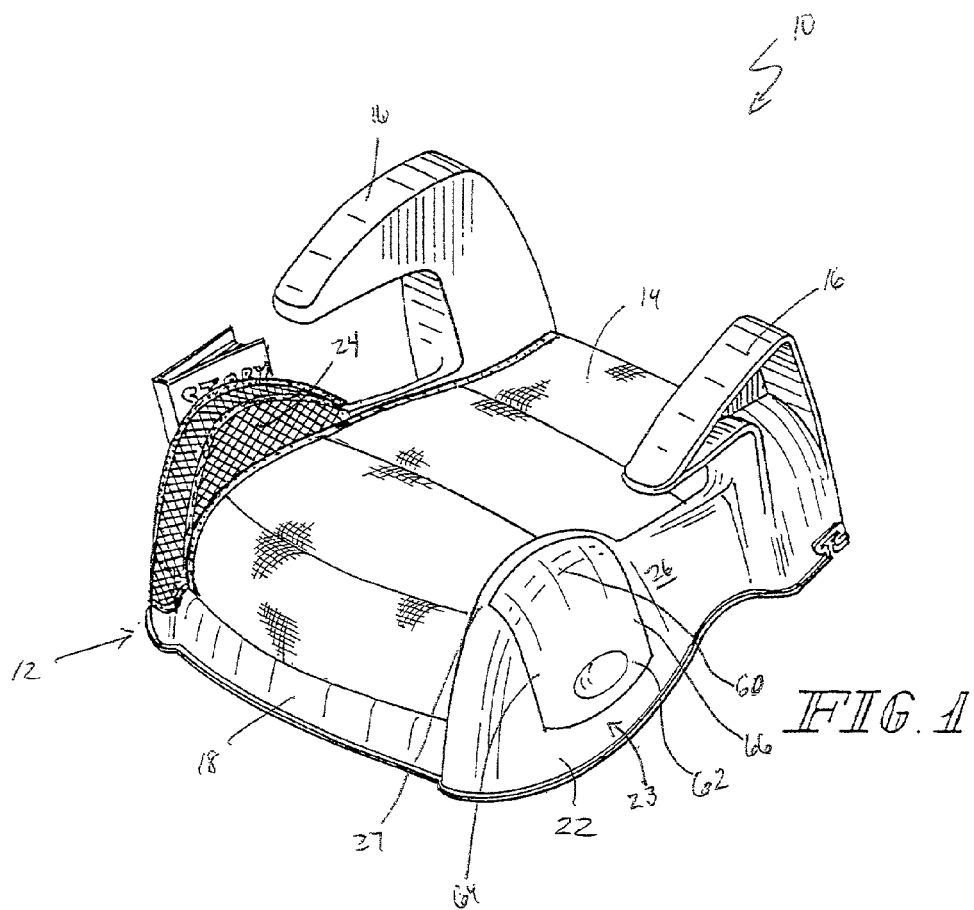
FIG. 1 is a perspective view of a juvenile seat having a base and a cup holder pivotably coupled to the base, showing the cup holder in the closed position adjacent the base.

As shown in FIG. 1, a juvenile seat 10 includes a base 12 to be placed upon a vehicle seat or other surface (not shown), the base including a front 18, rear 20, and opposite sides 22. Juvenile seat 10 includes a seating surface 13 between sides 22 and a seat pad 14 coupled to base 12. Juvenile seat 10 illustratively includes armrests 16 extending upwardly from sides 22 adjacent rear 20 of base 12.

Figure 2:
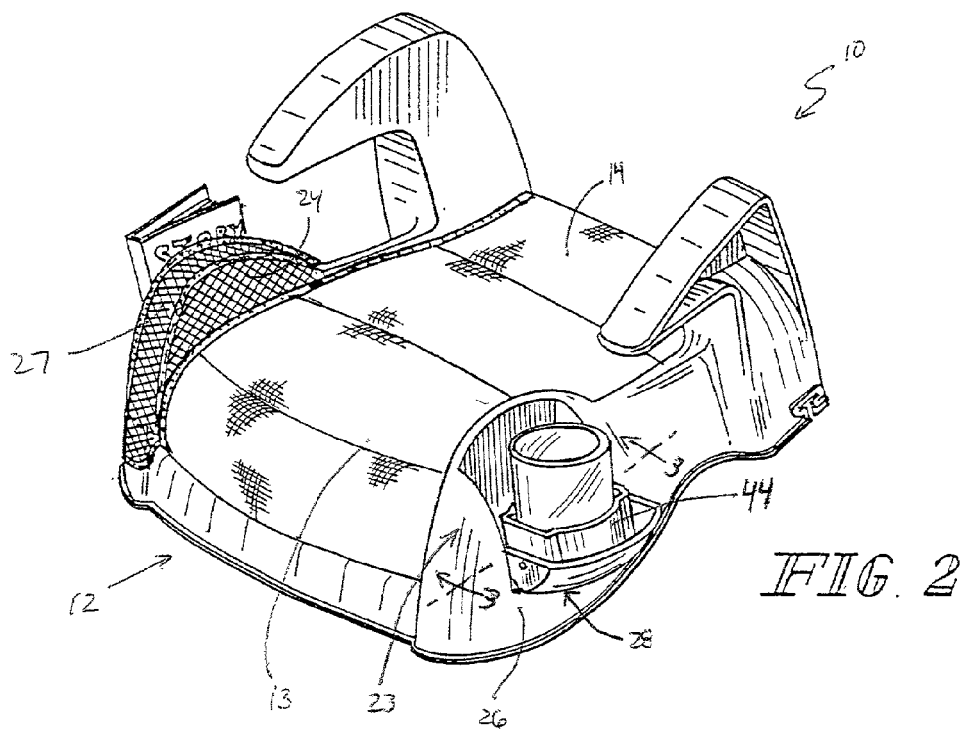
FIG. 2 is a fragmentary perspective view of the juvenile seat of FIG. 1 showing the cup holder in an opened position extending from the base.

As shown in FIG. 2, each of sides 22 includes an upstanding side wall 23 having an inwardly facing wall 24 facing the other of sides 22 and an outwardly facing wall 26 generally spaced apart from the inwardly facing wall. Inwardly and outwardly facing walls are illustratively joined near the top portions 27 thereof, the top portions extending upwardly beyond the height of seating surface 13.

Juvenile vehicle seat 10 further includes a cup holder 28 pivotably coupled to base 12 and movable between a closed position as shown in FIG. 1 and an opened position as shown in FIG. 2. Base 12 includes a cavity 30 formed in outwardly facing wall 26 of one of sides 22 to receive cup holder 28 in the closed position. Illustratively, first and second interior walls 32, 34 extend from outwardly facing wall 26 toward inwardly facing wall 24 on each side of cavity 30. Outwardly facing wall 26 includes a support edge 36 to support cup holder 28 in the opened position, as best observed in FIG. 3.

Cup holder 28 includes a shell 38 having an outer shell surface 40 and an inner shell surface 42 providing a cup retainer 44. Shell 38 further includes upper and lower portions 60, 62, and opposite shell sides 64, 66. Shell side 64 includes first connector portion 46 and shell side 66 includes second connector portion 48.

As used herein, the term "cavity" includes any sufficiently sized void or space to receive portions of shell 38 and cup retainer 44.

Figure 4:
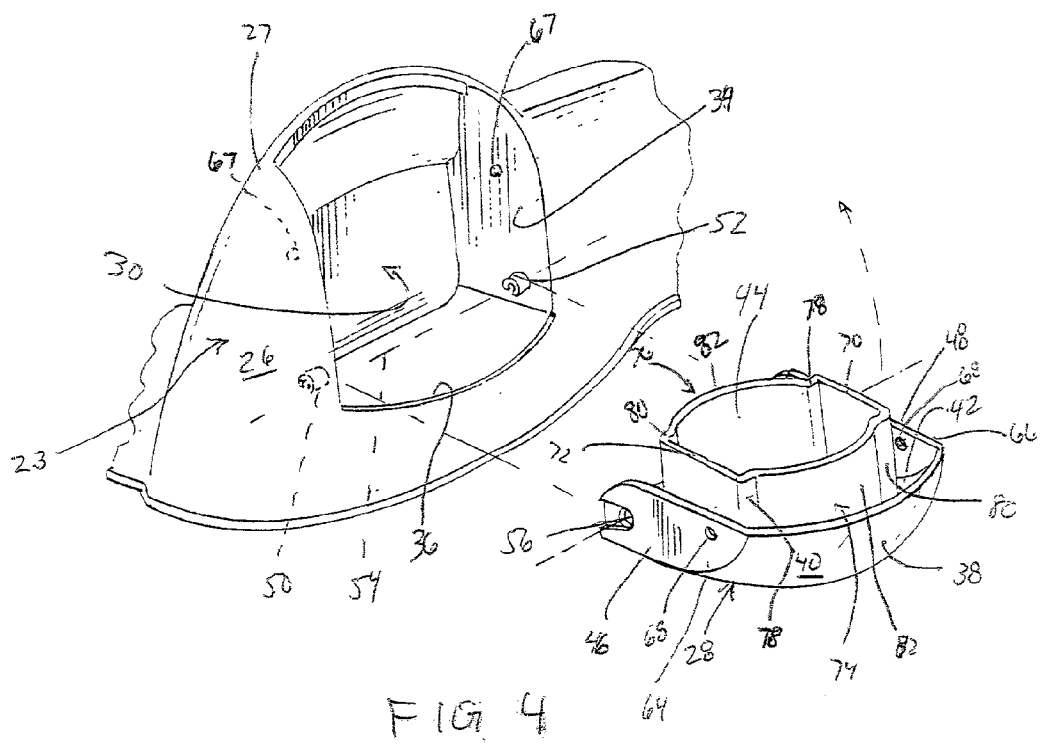
FIG. 4 is a fragmentary exploded perspective view of the juvenile seat of FIG. 1 showing a portion of the vehicle seat base and the cup holder separated from the base.

Cup holder 28 is pivotably coupled to base 12. As shown in FIG. 4, a first post 50 extends from first interior wall 32 into cavity 30 and a second post 52 extends from second interior wall 34 into cavity 30 and toward the first post. First and second posts 50, 52 cooperate to define a cup holder pivot axis 54. First connector portion 46 of shell 38 includes a first post opening 56 sized to receive first post 50 therein. Second connector portion 48 of shell 38 includes a second post opening 58 sized to receive second post 52 therein. Post 50 and its respective opening 56 constitutes a first hinge portion. Post 52 and its respective opening 58 constitutes a second hinge portion.

Although the illustrative embodiment discloses interior walls 32, 34 including posts 50, 52 and connector portions 46, 48 of the shell 38 including post openings 56, 58, it is within the scope of this disclosure to include posts with the connector portions and post openings with the interior walls to cooperate to permit pivoting movement of the cup holder relative to the base. It is also within the scope of this disclosure to pivotably couple cup holder 28 to outwardly facing wall 26. Moreover, this disclosure contemplates pivotably coupling the cup holder to the base by any method known to one of ordinary skill in the art.

Figure 3:
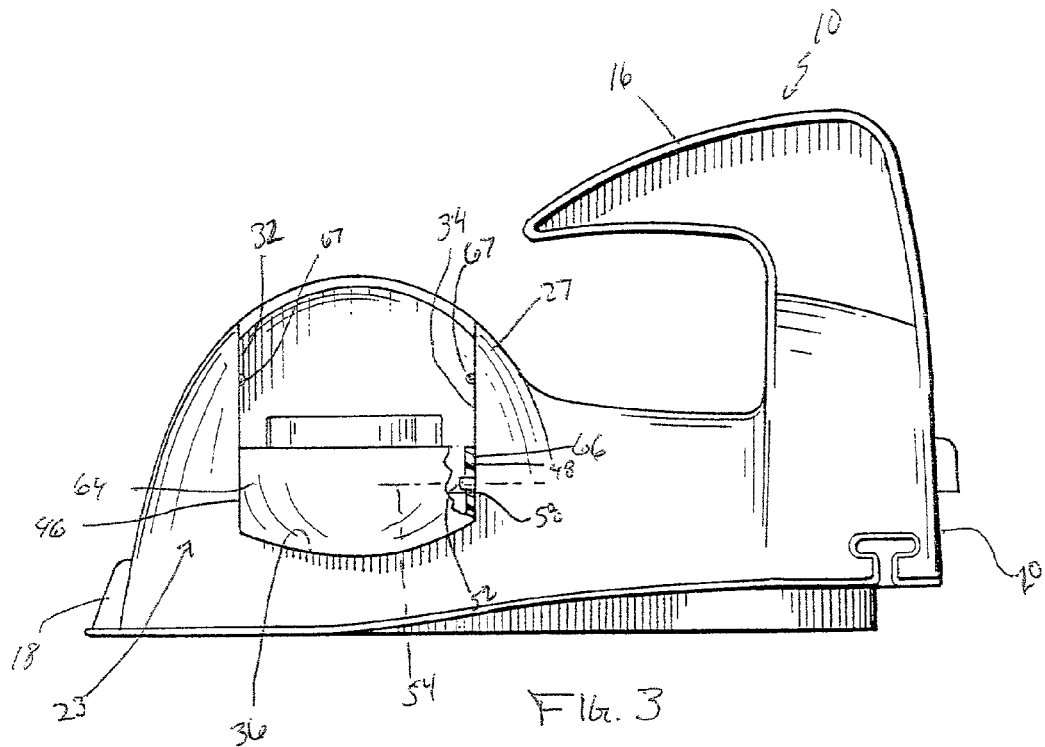
FIG. 3 is a side view of the juvenile seat of FIG. 1 with portions broken away showing a sectional view taken along line 3—3 of FIG. 2 of a connector portion of the cup holder engaging a post for pivoting about the post.

To move the cup holder from the closed position shown in FIG. 1 to the opened position shown in FIG. 2, a user applies a force to the lower portion 62 of shell 38, causing connector portions 46, 48, and thus cup holder 28, to pivot about axis 54 and move toward the opened position. In the opened position, support edge 36 engages outer shell surface 40 to provide, in combination with posts 50, 52, support to the cup holder and to prevent over-rotation of the cup holder beyond the opened position. As shown in FIG. 3, support edge 36 is illustratively shaped to match the contour of the portion of outer shell surface 40 engaged or contacted by the support edge when cup holder 28 is in the opened position. As shown in FIGS. 2 and 3, when cup holder 28 is in the opened position, cup retainer 44 faces upwardly or is open upwardly.

In the closed position shown in FIG. 1, cup retainer 44 is between inwardly facing wall 24 of the side of the base and outer shell surface 40 of cup holder 28. In the closed position, at least a majority of cup retainer 44 is in cavity 30 formed in one side 22 of base 12. Illustratively shell 38 of cup holder 28 has a convex shape that continues the convex shape of outwardly facing wall 26 of base 12, forming a smooth convex shape therewith when the cup holder is in the closed position.

Illustratively, first and second interior walls 32, 34 of base 12 each include a detent 67. First and second connector portions 46, 48 each include a recess 68 to cooperate with detents 67. When cup holder 28 is in the closed position, each detent 67 engages one of the recesses 68, preventing free rotation of cup holder 28 about axis 54. When a user applies a force to lower portion 62, detents 67 disengage recesses 68 and permit the user to move the cup holder from the closed position. It is within the scope of this disclosure to provide one or more detents on either of the cup holder or the base, and a recess to cooperate with the detent on the other of the base or the cup holder to prevent free rotation of the cup holder relative to the base. It is also within the scope of this disclosure to include any known method of providing two surfaces cooperating to produce friction between them to prevent free movement of the cup holder relative to the base.

Cup retainer 44 includes a pair of end walls 70, 72, and a pair of side walls 74, 76. Each side wall includes a pair of straight sections 78, 80 and a concave curved section 82 therebetween.

As shown in FIG. 2, the concave curved sections are spaced apart and arranged to provide a space sized to receive a round cup or can therein. The straight sections of the side walls and the end walls cooperate to provide a space sized to receive a rectangular "juice box." Thus, cup retainer 44 is adapted to receive both round and rectangular objects therein. A portion of inner shell surface 42 cooperates with the side walls and the end walls to support and retain such objects.

Figure 5:
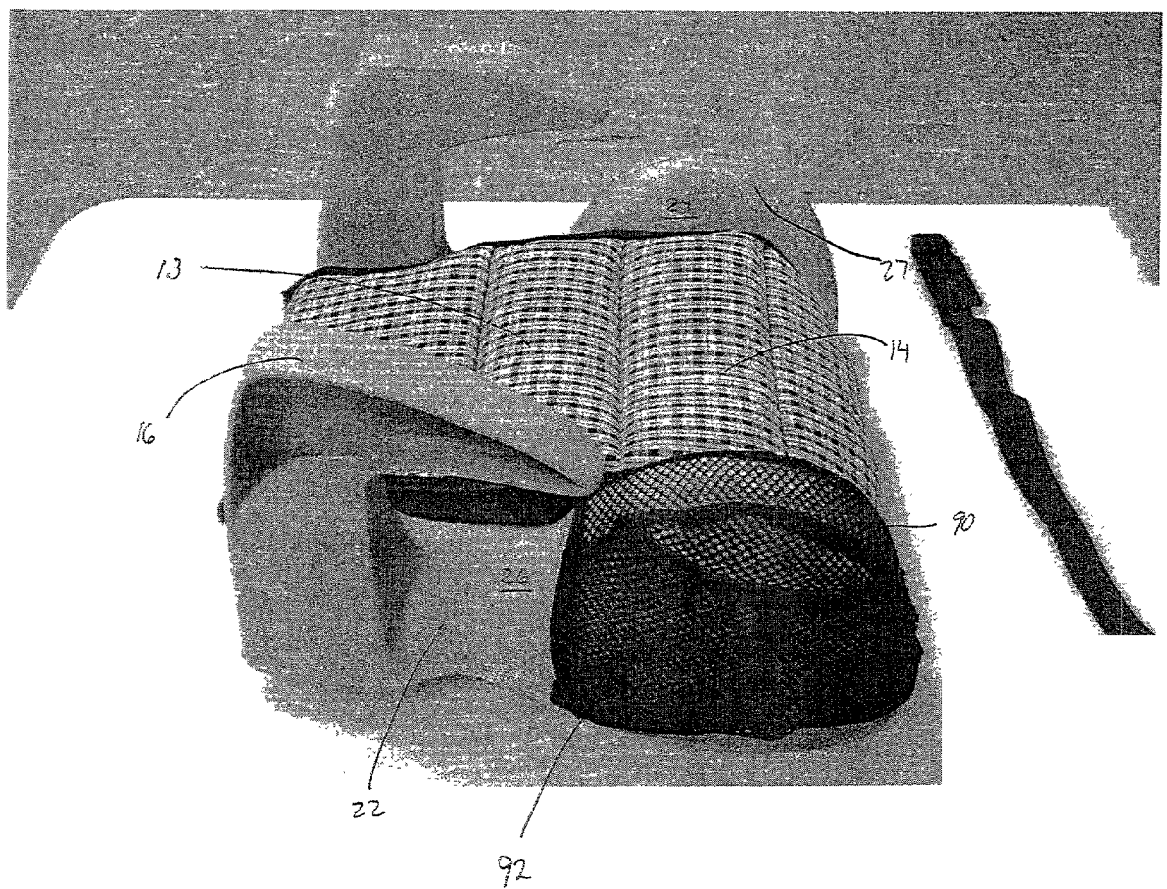
FIG. 5 is a perspective view of the juvenile seat showing a net extending over a portion of a side of the base, and a pocket associated with the net.
Figure 1:
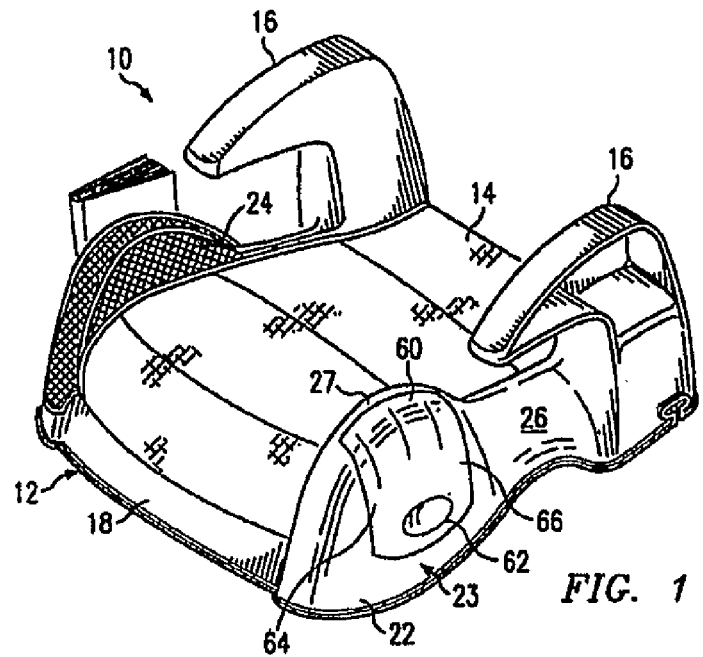
Figure 2:
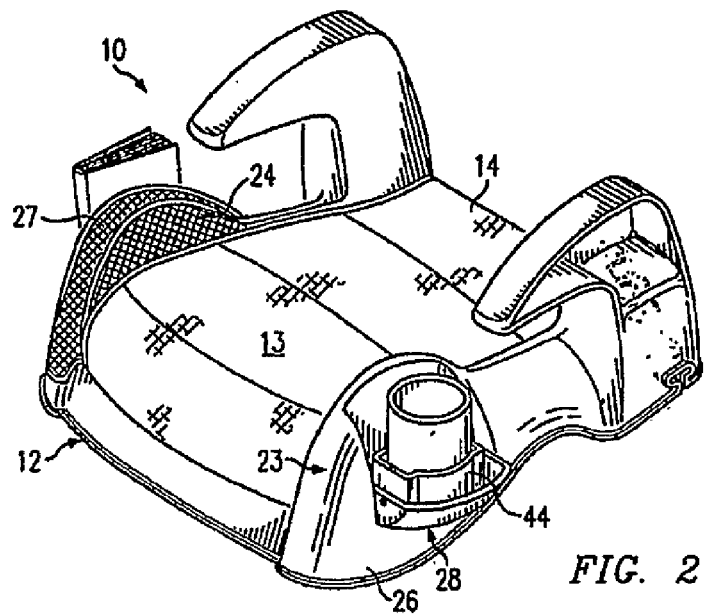
Figure 3:
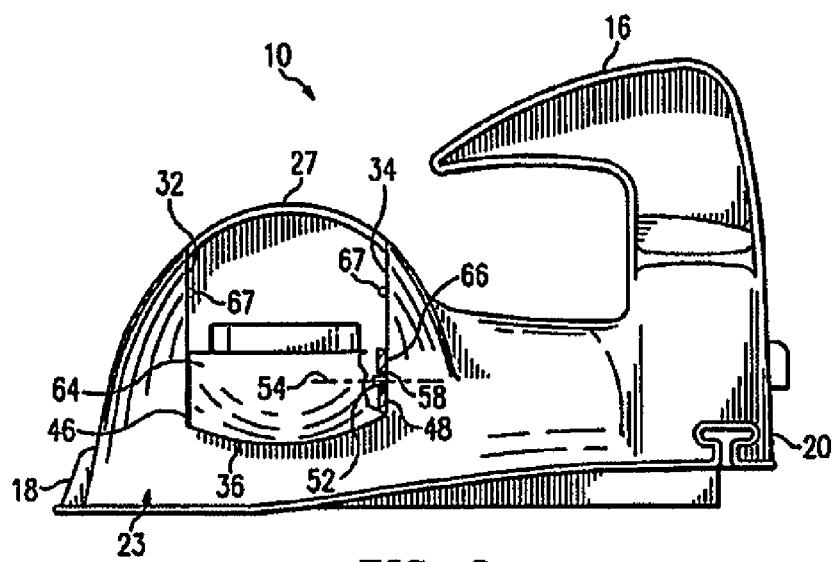
Figure 4:
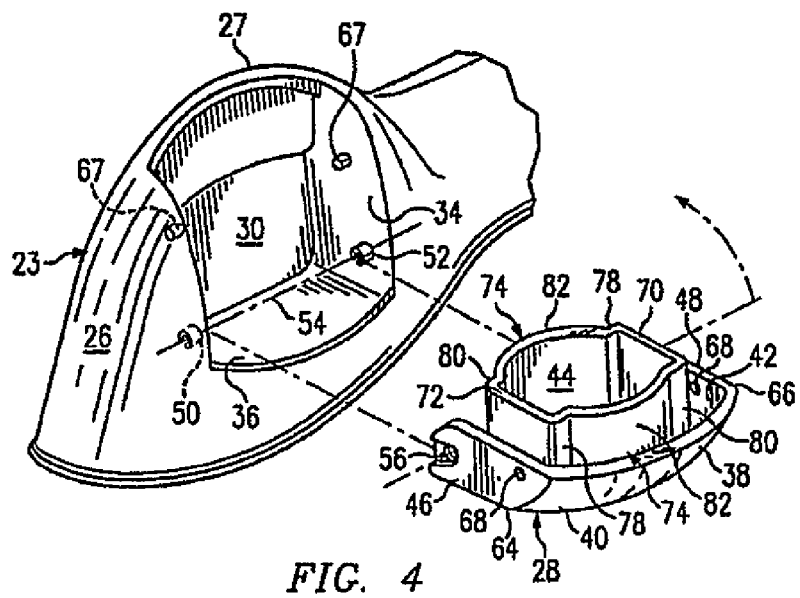
Figure 5:
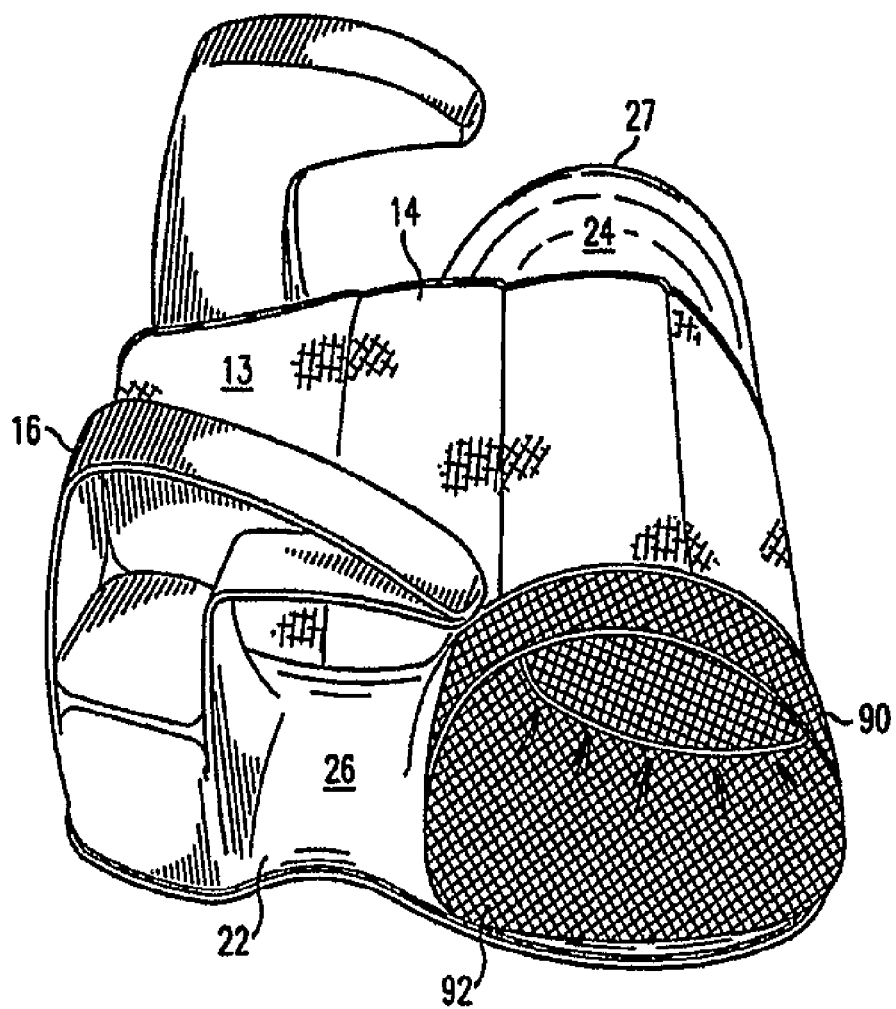

As illustrated in FIG. 5, a net 90 is coupled to seat pad 14 and extends over the side 22 that is opposite the side to which cup holder 28 is coupled. Net 90 extends upwardly from seating surface 13 to cover a portion of inwardly facing wall 24 of side 22 adjacent front 18. Net 90 extends downwardly toward the bottom of base 12 to cover a portion of outwardly facing wall 26 of side 22. Net 90 illustratively includes a pocket 92 to retain articles.

Although this application has described detail with reference to certain preferred or illustrative embodiments, variations and modifications exist within the scope and spirit of the invention as described and defined in the following claims.

The invention claimed is:

1. A juvenile seat comprising
a base adapted to be placed on a vehicle seat and having a front, a rear, opposite sides and a seating surface between the sides to receive an occupant, the base having, on at least one of the sides, an upstanding side wall having a cavity facing outwardly away from the seating surface,
a cup holder comprising a shell having an inner surface providing a cup retainer and an outer surface, the cup holder being coupled to the base to pivot between a closed position in which the cup retainer extends into the cavity and the outer surface merges with the upstanding side wall to form an exterior surface of the base and an opened position extending from the base in which the cup retainer is open upwardly and the outer surface is separated from the upstanding side wall.

2. A juvenile seat comprising
a base adapted to be placed on a vehicle seat and having a front, a rear, opposite sides and a seating surface between the sides to receive an occupant, the base having, on at least one of the sides, an upstanding side wall having a cavity facing outwardly away from the seating surface,
a cup holder comprising a shell having an inner surface providing a cup retainer and an outer surface, the cup holder being coupled to the base to pivot between a closed position in which the cup retainer extends into the cavity and an opened position extending from the base in which the cup retainer is open upwardly, wherein the base provides first and second posts extending into the cavity.

3. The juvenile seat of claim 2, wherein the shell includes first and second connectors, each connector being formed to include a post opening to receive one of the posts, the connectors pivoting about the posts when the cup holder is moved between the closed and the opened positions.

4. A juvenile seat comprising
a base adapted to be placed on a vehicle seat and having a front, a rear, opposite sides and a seating surface between the sides to receive an occupant, the base having, on at least one of the sides, an upstanding side wall having a cavity facing outwardly away from the seating surface,
a cup holder comprising a shell having an inner surface providing a cup retainer and an outer surface, the cup holder being coupled to the base to pivot between a closed position in which the cup retainer extends into the cavity and an opened position extending from the base in which the cup retainer is open upwardly, wherein the outer shell surface has a convex shape, the upstanding side wall has a convex shape, and the outer shell surface cooperates with the side wall to continue the convex shape of the side wall to form a smooth convex shape when the cup holder is in the closed position.

5. A juvenile seat comprising
a base adapted to be placed on a vehicle seat and having a front, a rear, opposite sides and a seating surface between the sides to receive an occupant, the base having, on at least one of the sides, an upstanding side wall having a cavity facing outwardly away from the seating surface,
a cup holder comprising a shell having an inner surface providing a cup retainer and an outer surface, the cup holder being coupled to the base to pivot between a closed position in which the cup retainer extends into the cavity and an opened position extending from the base in which the cup retainer is open upwardly, wherein at least one of the base or the cup holder includes a detent to engage a recess provided by the other of the cup holder or the base to prevent free movement of the cup holder from the closed position.

6. A juvenile seat comprising
a base adapted to be placed on a vehicle seat and including a front, a rear, and opposite sides, the base being formed to include an upstanding sidewall a cavity,
a cup holder comprising a shell having an inner surface providing a cup retainer and an outer surface, the cup holder being coupled to the base to pivot between a closed position wherein the cup retainer is positioned in the cavity and the outer surface merges with the upstanding side wall to form an exterior surface of the base and an opened position wherein the cup retainer extends from the base and faces upwardly and the outer surface is separated from the upstanding side wall.

7. The juvenile seat of claim 6, wherein the base includes an upstanding side wall having an inwardly facing wall and an outwardly facing wall, and the cavity is formed in the outwardly facing wall.

8. A juvenile seat comprising
a base adapted to be placed on a vehicle seat and including a front, a rear, and opposite sides, the base being formed to include a cavity,
a cup holder comprising a shell having an inner surface providing a cup retainer and an outer surface, the cup holder being coupled to the base to pivot between a closed position wherein the cup retainer is positioned in the cavity and an opened position wherein the cup retainer extends from the base and faces upwardly and wherein one of the base or the cup holder includes a post and the other of the base or the side wall includes a post opening to receive the post to permit pivoting movement of the cup holder relative to the base.

9. A juvenile seat comprising
a base adapted to be placed on a vehicle seat and including a front, a rear, and opposite sides, the base being formed to include a cavity,
a cup holder comprising a shell having an inner surface providing a cup retainer and an outer surface, the cup holder being coupled to the base to pivot between a closed position wherein the cup retainer is positioned in the cavity and an opened position wherein the cup retainer extends from the base and faces upwardly and wherein the base includes an upstanding side wall having an outwardly facing wall, the outwardly facing wall including opposing interior walls extending toward the other side of the base, each interior wall including a post extending into the cavity, the cup holder being pivotably coupled to the posts.

10. The juvenile seat of claim 9, wherein the cup holder includes first and second connectors, each connector having a post opening to receive one of the posts, the posts defining a pivot axis about which the cup holder pivots.

11. A juvenile booster seat adapted to be placed on a vehicle seat comprising
a base including a front, opposite sides, a seating surface between the sides, and a back the base being formed to include an upstanding sidewall having a cavity, and
a cup holder having a shell and a cup retainer coupled to the shell, the cup holder being coupled to one of the sides of the booster seat to pivot between a closed position placing the shell alongside the upstanding sidewall of the booster seat and preventing access to the cup retainer and an opened position permitting access to the cup retainer.

12. The juvenile booster seat of claim 11, wherein the one side comprises a generally inwardly facing wall and a generally outwardly facing wall, the outwardly facing wall having a cavity therein to receive at least a portion of the cup retainer in the closed position.

13. The juvenile booster seat of claim 12, wherein the shell includes an outer surface and an inner surface providing the cup retainer, the cup retainer being positioned in the cavity when the cup holder is in the closed position.

14. The juvenile booster seat of claim 13, wherein the outwardly facing wall is convex, and the outer surface is continuous with the outwardly facing wall when the cup holder is in the closed position.

15. A juvenile booster seat adapted to be placed on a vehicle seat comprising
a front, opposite sides, a seating surface between the sides, and a back, and
a cup holder having a shell and a cup retainer, the cup holder being coupled to one of the sides of the booster seat to pivot between a closed position preventing access to the cup retainer and an opened position permitting access to the cup retainer, wherein the shell includes a first hinge portion having an opening, and the side to which the cup holder is coupled includes a second hinge portion having a post, the coupling between the cup holder and the one of the sides being provided by the hinge portions.

16. The juvenile booster seat of claim 11, wherein the shell includes an upper portion and a lower portion, and when the user applies a force to the lower portion of the shell, the cup holder pivots toward the opened position.

17. A juvenile booster seat adapted to be placed on a vehicle seat comprising
a front, opposite sides, a seating surface between the sides, and a back, and
a cup holder having a shell and a cup retainer, the cup holder being coupled to one of the sides of the booster seat to pivot between a closed position preventing access to the cup retainer and an opened position permitting access to the cup retainer, wherein the shell includes an outer shell surface and an inner shell surface, and the side to which the cup holder is coupled includes a support edge to contact a portion of the outer shell surface to support the cup holder in the opened position, the support edge having a shape to match the shape of the portion of the outer shell surface so contacted.

* * * * *

UNITED STATES PATENT AND TRADEMARK OFFICE
CERTIFICATE OF CORRECTION

PATENT NO. : 6,997,509 B2
APPLICATION NO. : 10/032633
DATED : February 14, 2006
INVENTOR(S) : James M. Kain It is certified that error appears in the above-identified patent and that said Letters Patent is hereby corrected as shown below:

Please replace old existing drawings with these new attached drawings.

Signed and Sealed this

Twentieth Day of February, 2007

JON W. DUDAS
*Director of the United States Patent and Trademark Office*